United States Patent
Naumann et al.

(10) Patent No.: US 6,992,031 B2
(45) Date of Patent: Jan. 31, 2006

(54) METHOD FOR PRODUCING ALUMINOSILICATE GLASS

(75) Inventors: Karin Naumann, Ober-Olm (DE); Franz Ott, Mitterteich (DE); Ralf Diezel, Mitterteich (DE); Otmar Becker, Langen (DE)

(73) Assignee: Schott Glas, Mainz (DE)

( * ) Notice: Subject to any disclaimer, the term of this patent is extended or adjusted under 35 U.S.C. 154(b) by 2 days.

(21) Appl. No.: 10/333,213

(22) PCT Filed: Jul. 12, 2001

(86) PCT No.: PCT/EP01/08036

§ 371 (c)(1),
(2), (4) Date: Aug. 8, 2003

(87) PCT Pub. No.: WO02/06172

PCT Pub. Date: Jan. 24, 2002

(65) Prior Publication Data

US 2004/0029702 A1    Feb. 12, 2004

(30) Foreign Application Priority Data

Jul. 19, 2000 (DE) .............................. 100 34 985

(51) Int. Cl.
*C03C 3/085* (2006.01)
*C03C 3/091* (2006.01)

(52) U.S. Cl. .......................... 501/69; 501/64; 501/66; 501/67; 65/135.9

(58) Field of Classification Search ................. 501/66, 501/67, 69, 70, 72, 64; 65/135.9
See application file for complete search history.

(56) References Cited

U.S. PATENT DOCUMENTS

| | | | |
|---|---|---|---|
| 5,770,535 A | 6/1998 | Brix et al. | |
| 6,329,310 B1 | 12/2001 | Peuchert et al. | |
| 6,417,124 B1 * | 7/2002 | Peuchert et al. | 501/66 |
| 6,468,933 B1 * | 10/2002 | Narita et al. | 501/56 |
| 6,508,083 B1 * | 1/2003 | Naka et al. | 65/134.3 |
| 6,664,203 B2 * | 12/2003 | Nagashima et al. | 501/66 |
| 2002/0013210 A1 | 1/2002 | Peuchert et al. | |
| 2003/0087746 A1 * | 5/2003 | Ritter et al. | 501/66 |

FOREIGN PATENT DOCUMENTS

| | | |
|---|---|---|
| DE | 19603698 C1 | 8/1997 |
| DE | 10000839 C1 | 5/2001 |
| EP | 1044932 A1 | 10/2000 |
| EP | 1078889 A1 | 2/2001 |
| JP | 2001089158 A | 8/2000 |
| JP | 2001-151534 * | 6/2001 |

* cited by examiner

Primary Examiner—Karl Group
(74) Attorney, Agent, or Firm—Millen White Zelano & Branigan, P.C.

(57) ABSTRACT

The invention relates to a method for producing aluminosilicate glass that is devoid of alkali and that has a $B_2O_3$ content of between 0 and <5 wt.-% and a BaO content in excess of 5.5 wt.-%. Said method is characterised by the addition of between 0.05 wt.-% and 1.0 wt.-% $SnO_2$ during the preparation of the mixture.

25 Claims, No Drawings

METHOD FOR PRODUCING ALUMINOSILICATE GLASS

The invention relates to a process for producing aluminosilicate glasses with addition of a fining agent to the batch formulation. The invention also relates to the glasses comprising the fining agent and to uses of the glasses.

Processes for producing glasses consist of the steps of batch formulation, also called batch charging, melting of the glass, and subsequent hot forming thereof. The term melting also embraces the steps of fining, homogenizing and conditioning for further processing, which follow the melting-in operation.

As applied to melts, fining refers to the removal of gas bubbles from the melt. In order to achieve a very high level of freedom from extraneous gases and bubbles, it is necessary for the melted batch to be thoroughly mixed and degassed. The characteristics of gases and bubbles in the glass melt, and their removal, are described, for example, in 'Glastechnische Fabrikationsfehler' [glass-making defects], edited by H. Jebsen-Marwedel and R. Brückner, 3rd Edition, 1980, Springer-Verlag, page 195 ff.

There are two fundamentally different fining processes which are common knowledge: they differ essentially in the way the fining gas is produced:

In the case of mechanical fining, gases such as water vapour, oxygen, nitrogen or air, are injected through openings in the bottom of the melting unit. This process is known as bubbling.

The most frequent fining processes are the chemical processes.

Their principle, consists in adding to the melt or even to the batch
  a) Compounds which give off gases at relatively high temperatures in an equilibrium reaction, or
  b) Compounds which are volatile at relatively high temperatures, or
  c) Compounds which decompose in the melt and in doing so release gases.

As a result, the volume of existing bubbles is increased and their distension is intensified.

The first-mentioned group of compounds embraces those known as redox fining agents, such as antimony oxide and arsenic oxide, for example. In the case of this process, which is the most frequently used in practice, the redox fining agents employed comprise polyvalent ions which are able to exist in at least two oxidation states and which are in a temperature-dependant equilibrium of one another; at high temperatures a gas, usually oxygen is released.

The second group, made up of compounds which are volatile at high temperatures owing to their vapour pressure and so exert their effect, includes, for example, sodium chloride and various fluorides. They are referred to collectively as evaporation fining agents.

The last-mentioned type of chemical fining, i.e. fining by means of compounds which decompose and in doing so release gases, referred to here as decomposition fining agents, includes sulphate fining. This fining is known for low-melting glasses, such as for soda-lime glasses, since the commonly used $Na_2SO_4$ (in the case of mass-produced glasses, also in the form of Glauber's salts, $Na_2SO_4 \cdot 10\,H_2O$) reacts with the $SiO_2$ that is always present at temperatures which, in comparison with the $Na_2SO_4$ which is relatively stable on its own, are low, in accordance with the equation

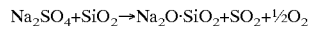

or

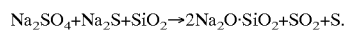

On grounds not least of the environment, the aforementioned redox fining agent $Sb_2O_3$ and $As_2O_3$ are not readily used.

Moreover, they are unsuitable for fining glasses that are to be used as bulb glasses for halogen lamps on account of the fact that they are readily reducible and, in the course of hot processing in the flame the crimp, i.e. the melt formed between glass and current supply leads, acquires a brown discolouration owing to the reduction of the antimony oxide or arsenic oxide. Moreover, $Sb_2O_3$ in particular, at least in relatively high fractions, promotes unwanted blackening on the inside of the bulb, which originates from tungsten deposition owing to disruptions in the halogen cycle.

$As_2O_3$ and $Sb_2O_3$ are also unsuitable for the fining of flat glasses produced on a float unit, since under the reducing conditions which prevail in such a process they would be reduced to elemental As or Sb, respectively, on the float bath.

An alternative redox fining agent is $CeO_2$. However, it is relatively expensive and, especially in relatively large amounts, may lead to unwanted fluorescence phenomena in the glass and to yellowing of the glass.

Redox fining is tied to the temperatures at which the corresponding redox processes proceed, owing to the thermodynamic circumstances. For many glass melts, such as the melts of soda-lime glasses and other relatively low-melting glasses (e.g. borate glasses, lead glasses) these facilities are sufficient.

However, in the case of glasses with melting temperatures (temperature at a viscosity of about $10^2$ dPas) of between about 1550° C. and 1650° C., which for adequate fining means fining temperatures of more than 1600° C., the bubbles form more poorly owing to increased glass melt viscosity. The growth tendency of such bubbles is lower, and they rise more poorly than at lower viscosities. Accordingly, fine bubbles are formed which are very difficult if not impossible to remove even by reducing the throughput or by means of higher temperatures, so making such glasses unusable. The reason for this is that the absorption effect of some chemical redox fining agents, e.g. $Sb_2O_3$, i.e. the ability to reabsorb the oxygen or other gases from the fine bubbles on cooling and thus to remove those gases, is inadequate for many high-melting glasses.

The possibilities of increasing the temperatures for the purpose of reducing viscosity and of prolonging the melting and fining times, which exist in principle to a certain extent, are uneconomic, since the last-mentioned measure, for example, would excessively reduce the melt outputs.

The abovementioned high-melting glasses include in particular aluminosilicate glasses, i.e. silicate glasses containing at least 10% by weight $Al_2O_3$, especially alkali-free aluminosilicate glasses, in particular aluminosilicate glasses containing little or no $B_2O_3$, especially those having a relatively high BaO content, particularly aluminosilicate glasses which, owing to the high temperature stability associated with the high melting temperatures, are used as substrate glasses in, for example, display technology, or in particular as lamp glasses, for halogen lamps for example.

A further redox fining agent is $SnO_2$, which forms fining gas in accordance with the reaction equation $SnO_2 \rightarrow SnO + \frac{1}{2}O_2$. Gases such as $CO_2$ which are dissolved in the melt diffuse into an $O_2$ bubble formed in this way. Those bubbles which are large enough rise by distension to the glass surface, where the gas is emitted from the melt. Even after the fining process, small bubbles remain in the melt. If the temperature is lowered, the tin oxide with higher valency is formed again and takes up oxygen from the bubbles still present in accordance with equation $SnO + \frac{1}{2}O_2 \rightarrow SnO_2$. This, in other words, is a reabsorption.

$SnO_2$ is a good nucleating agent and promotes crystallization, so that when $SnO_2$ is used as a fining agent the likelihood of crystal-induced glass defects and of elimination of cassiterite phases is increased.

The patent literature has already disclosed aluminium-containing glasses which, in some cases along with other fining agents include $SnO_2$.

For instance, JP 10-130034 A describes aluminoborosilicate glasses which besides $SnO_2$ mandatorily comprise $As_2O_2$, while JP 10-114538 A describes aluminoborosilicate glasses which besides $SnO_2$ mandatorily comprise $Sb_2O_3$.

JP 11-43350 A describes aluminoborosilicate glasses which in addition to $SnO_2$ mandatorily contain $Sb_2O_3$ and $Cl_2$. JP 10-324526 A describes aluminoborosilicate glasses to which a component from the group consisting of $Fe_2O_3$, $Sb_2O_3$, $SnO_2$ and $SO_3$ and one from the group consisting of Cl and F are added and which still include an $As_2O_3$ fraction.

JP 10-139 467 A describes aluminoborosilicate glasses containing from 0.1 to 20 mol % of $SnO_2$ and/or $TiO_2$ and/or $ZrO_2$.

JP 10-59741 A describes $SnO_2$-containing aluminoborosilicate glasses which, like the glasses of the other cited documents, may vary within a relatively wide range in terms of their composition.

Aluminoborosilicate glasses containing $SnO_2$ are also already known from the applicant's publications DE 196 03 698 C1, DE 196 17 344 C1, DE 196 01 922 A1 and DE 197 39 912 C1.

A common feature of these glasses is that they contain high levels of $B_2O_3$, thereby lowering the melting temperature.

As a result it is possible to prevent the $Sn^{2+}$ which is formed in the course of fining from being reduced further to the metal, since high temperatures would more strongly stabilise the low oxidation states of polyvalent ions. Elemental Sn would lead to the formation of alloy at the electrodes of the melt end.

It is an object of the invention, then, to provide a process for producing aluminosilicate glasses where the glass melt is effectively fined, i.e. which results in glass of high quality in terms of absence or paucity of bubbles and permits fining of the glass melts, especially those of glasses which melt at high temperatures.

This object is achieved by the process according to claim 1.

In the process for producing an alkali-free aluminosilicate glass, comprising the steps of batch formulation, melting of the glass and subsequent hot forming, the term melting embracing not only the melting of the raw materials and cullet but also the subsequent steps of fining and homogenizing, at least one fining agent, and specifically between 0.05% by weight and 1.0% by weight of $SnO_2$, is added to the batch.

Preference is given to an addition of from 0.1 to 0.5% by weight of $SnO_2$.

The tin oxide here is used in the form of tetravalent tin dioxide $SnO_2$, which is held in this oxidation state by additions of nitrate to the batch. At the higher temperatures in the fining section of the melt end, the tin ions undergo partial transition to the divalent state, with the oxygen bubbles formed rising and so contributing to fining by virtue of the fact that gases dissolved in the melt diffuse into these bubbles and so are removed from the glass. Very small bubbles which have not risen are reabsorbed at the end of the fining phase, known as the takedown phase, i.e. at low temperatures, by the tin monoxide, SnO, that is present at that point and which is oxidized to $SnO_2$ in the course of this reabsorption.

The nitrate for stabilizing the tetravalent tin ions may be introduced by way of various glass components: e.g., in the form of $Ba(NO_3)_2$, $Mg(NO_3)_2$, $Ca(NO_3)_2$, $Al(NO_3)_3$ or the like.

The process of the invention is used for producing aluminosilicate glasses—by which are understood silicate glasses containing at least 10% by weight $Al_2O_3$—which contain between 0 and <5% by weight $B_2O_3$ and from 5.5% by weight BaO.

The process of the invention is used to produce glasses which, except for customary impurities, are free from alkali metal oxides. The impurities fraction may be minimised by using low-alkali raw materials and also by clean conditions at the batch formulation stage and in the batch-feeding section of the melt end. Accordingly, the term alkali-free should be understood here to refer to an alkali metal oxide content of not more than 0.1% by weight.

The process is particularly suited to the production of aluminosilicate glasses having melt temperatures >1650° C.

The process is used in particular to produce aluminosilicate glasses having thermal expansion coefficients after $\alpha_{20/300} < 7.5 \cdot 10^{-6}$/K, generally glasses having high $Al_2O_3$ contents, preferably $\geq 12\%$ by weight $Al_2O_3$, with particular preference $\geq 13.5\%$ by weight $Al_2O_3$, which leads to an increase in the melting temperature and fining temperature.

The process is used in particular to produce what are known as hard glasses, i.e. glasses having high transition temperatures Tg (>600° C.) and low thermal expansion ($\alpha_{20/300} < 5.5 \cdot 10^{-6}$/K).

The process of the invention is preferably used to produce glasses having a composition in the following range:
$SiO_2$ 46–64, $Al_2O_3$ 12–26, $B_2O_3$ 0–<5, MgO 0–7, CaO 3–14, SrO 0–11, BaO 6–25, $ZrO_2$ 0–5, $TiO_2$ 0–0.6, $P_2O_5$ 0–9, $SnO_2$ 0.05–1.

The process of the invention is therefore used in particular to produce glasses which are suitable both as substrate glasses for display technology and for photovoltaics and as lamp bulb glasses for halogen lamps.

The person skilled in the art knows how to conduct the process step of batch formulation with appropriate raw materials in such a way as to obtain a glass having the specified composition. For instance, as is known, $P_2O_5$ has a high volatility, so that up to 20% can evaporate when the glass is melted, which the skilled person will take into account at the batch formulation stage.

The process is used in particular to produce glasses with a composition in the following range (in % by weight based on oxide):
$SiO_2$ 46–63; $Al_2O_3$ 12–25, preferably >17; MgO 0–5; preferably 0–4; CaO 3–14, SrO 0–11; BaO 6–15, where MgO+CaO+SrO+BaO $\leq 25$, where SrO+BaO $\geq 10$; $ZrO_2$ 0.1–5; $P_2O_5$ 0.1–9, preferably 0.5–9, $SnO_2$ 0.05–1.

For the abovementioned uses, especially as lamp bulb glass, particularly suitable glasses are those which are produced by the process of the invention and have compositions from the following range (in % by weight based on oxide):

$SiO_2$ >55–64, $Al_2O_3$ 13.5-15.5, $B_2O_3$ 0–<5, MgO 0–7, CaO 5–14, SrO 0–8, BaO 6–17, $ZrO_2$ 0–2, $TiO_2$ 0–0.5, $SnO_2$ 0.05–1.

In this context, glasses with a composition from the following range (in % by weight based on oxide):

$SiO_2$ 59–62, $Al_2O_3$ 13.5–15.5, $B_2O_3$ 3–<5, MgO 2.5–5, CaO 8.2–10.5, BaO 8.5–9.5, $ZrO_2$ 0–1.5, $TiO_2$ 0–0.5, $SnO_2$ 0.05–1.

are particularly suitable as bulb glasses for halogen lamps with bulb temperatures of not more than 660° C., while glasses with a composition in the following range (in % by weight based on oxide):

$SiO_2$ >58–62; $Al_2O_3$ 14–17.5, preferably 15–17.5; $B_2O_3$ 0–1, preferably 0.2–0.7; MgO 0–7, preferably 0–<1; CaO 5.5–14; SrO 0–8; BaO 6–17, preferably 6–10; $ZrO_2$ 0–1.5, preferably 0.05–1; $TiO_2$ 0–0.5, $SnO_2$ 0.05–1.

are suitable for halogen lamps with bulb temperatures of more than 660° C.

The glasses produced by the process of the invention may further comprise the following polyvalent compounds: up to 2% by weight of $MoO_3$, up to 2% by weight of $WO_3$, up to 0.6% by weight of $CeO_2$, up to 0.2% by weight $MnO_2$, up to 0.5% by weight of $Fe_2O_3$, and up to 0.2% by weight of $V_2O_5$. The sum of these components should be between 0 and 3% by weight.

As already elucidated for $SnO_2$, the compounds in the glass may be present in different oxidation states; as for $SnO_2$ as well, however, their content is in each case stated for the specified oxidation state.

It is a particular advantage that in the process of the invention no evaporation fining agents such as chlorides and fluorides are used. Owing to the high solubility in glass of the fluorides in particular, the amounts needed for effective fining would be so large that the physical and chemical properties of the glasses would be modified to such an extent as to excessively lower their thermal stability and viscosity. If borosilicate glasses containing Cl⁻ were reheated, such as in cases of remelting, it would be possible for white coatings, known as lamp rings, to occur.

It is a particular advantage that there is no need for decomposition fining agents in the process of the invention.

It is a particular advantage that with the process of the invention it is possible to produce glasses which except for unavoidable impurities are free from readily reducible constituents, especially $As_2O_3$, $Sb_2O_3$, CdO, PbO, $Bi_2O_3$. The avoidance of these components is not only advantageous on grounds of environmental protection but also permits hot forming on a float unit in the process of the invention, for example for the production of substrates for display technology or photovoltaics.

The process of the invention is particularly advantageous for the production of alkali-free halogen lamp glasses which, because of the high temperature stability they are required to have, have high melting temperatures. Here, the process is able to be a complete substitute for $Sb_2O_3$ fining.

In halogen lamp glasses produced by the process, even at the high lamp operating temperatures mentioned and following prolonged usage of the lamp, there is a reduction of the blackening of the inside of the bulb which occurs as a result of deposition of tungsten as a consequence of disruptions in the halogen cycle. In other words, the regenerative halogen cycle in the lamp can be maintained for longer than is the case with $Sb_2O_3$-fined glasses. Also, there is no browning of the crimp in the course of hot processing in the flame.

The abovementioned process step of hot forming includes not only the floating and tube drawing but also a very wide variety of customary hot forming methods such as drawing, into tubes or strips, or floating or rolling, casting, blowing, pressing, as appropriate to the intended use of the glasses, flat glasses or hollow glasses produced. Here again, the person skilled in the art is readily able to select the appropriate glass composition and to choose accordingly the parameters of the hot forming process step.

The step in the production process of the invention that is essential to the invention, namely the addition of the stated amount of $SnO_2$, results in very effective fining, which is reflected in the outstanding quality—i.e. paucity of bubbles—of the glasses produced.

Quite unexpectedly and in contrast to all experience to date in the field of the production of high-melting glasses, the process of the invention is outstandingly suitable for the production of high-melting alkali-free low-boron or boron-free aluminosilicate glasses.

Surprisingly, in accordance with the process of the invention, these glasses may be produced with melting temperatures >1650° C. without reduction of the tin ions to elemental tin.

The glasses produced are free from crystallization defects. Glass of an outstanding quality which meets the specifications for lamp bulb glasses is obtained.

There is no formation of alloy at the Pt electrodes and there is no Pt electrode corrosion.

Accordingly, the process of the invention comprises efficient and cost-effective fining of the glasses. Glass melts in particular which at the customary fining temperatures have a high viscosity, namely melts of alkali-free, high BaO content, boron-free or low-boron glasses, and which are therefore difficult to fine, may be fined to glasses of high quality with high melt outputs.

The invention is to be elucidated further with reference to working examples and comparative examples.

For all of the examples the following procedure was used:

Using a batch charger, the batch was charged continuously to a melt end, the amount charged being regulated by the level of the liquid glass in the melt end. In the description of the invention, this charging operation is included in the term batch formulation. Melting, fining and take down of the melted glass were carried out in the customary manner by lowering the temperature. In a working end and a downstream feeder channel—where a spinner is also possible—the glass was conditioned chemically and thermally by stirring.

For the comparative example, a glass whose basic composition was as follows (in % by weight based on oxide): 59.1 $SiO_2$; 4.6 $B_2O_3$; 14.5 $Al_2O_3$; 8.8 BaO; 10.3 CaO; 2.5 MgO; 0.18 $Sb_2O_3$ was melted at >1630° C. and fined. Raw materials used were oxide and carbonates. 1.5% by weight of the BaO were used in the form of barium nitrate.

The bubble count of the glass thus produced is ≧20/kg of glass and cannot be lowered even by reducing the melt output by 20%. Small and very small bubbles in particular, referred to as seeds, i.e. the bubbles which on the tube have an extended length <1 cm, are the most frequent glass defects in the product.

For Working Example 1, a glass of the same basic composition as the comparative example but without the $Sb_2O_3$ and with 0.2% by weight of $SnO_2$ was produced. Otherwise, the raw materials used were the same.

The bubble count was reduced to less than 10 per kg of glass, thereby emphasising the improvement of fining by means of $SnO_2$. The fact that besides a few relatively large bubbles there were virtually no fine seeds now, and that the desired effect—namely the reduction in seediness in favour of a few large bubbles, which were able to rise more easily and which have left the melt—has occurred are a further sign of the very good fining effect.

As a further example (Working Example 2) a glass of the following basic composition (in % by weight based on oxide): 60.7 $SiO_2$; 0.3 $B_2O_3$; 16.5 $Al_2O_3$; 7.85 BaO; 13.5 CaO; 1.0 $ZrO_2$ was produced. 0.25% by weight of $SnO_2$ was added. The melting temperature was >1640° C.; otherwise, the production conditions were the same as those mentioned above. Here again, under comparable melting conditions, glass with <10 bubbles/kg of glass was obtained.

What is claimed is:

1. A process for producing an alkali-free aluminosilicate glass comprising charging an alkali-free aluminosilicate glass batch comprising, in % by weight based on oxide, $B_2O_3$<5, BaO>5.5, and $SnO_2$, 0.05–1.0;

and subsequently melting and hot forming a resultant alkali-free aluminosilicate glass.

2. A process according to claim 1,
wherein the alkali-free aluminosilicate glass batch (in % by weight based on oxide) comprises:

| | |
|---|---|
| $SiO_2$ | 46–64 |
| $Al_2O_3$ | 12–26 |
| $B_2O_3$ | 0–<5 |
| MgO | 0–7 |
| CaO | 3–14 |
| SrO | 0–11 |
| BaO | 6–25 |
| $ZrO_2$ | 0–5 |
| $TiO_2$ | 0–0.6 |
| $P_2O_5$ | 0–9 |
| $SnO_2$ | 0.05–1. |

3. A process according to claim 2,
wherein the alkali-free aluminosilicate glass batch (in % by weight based on oxide) comprises:

| | |
|---|---|
| $SiO_2$ | >55–64 |
| $Al_2O_3$ | 13–18 |
| $B_2O_3$ | 0–<5 |
| MgO | 0–7 |
| CaO | 5–14 |
| SrO | 0–8 |
| BaO | 6–17 |
| $ZrO_2$ | 0–2 |
| $TiO_2$ | 0–0.5 |
| $SnO_2$ | 0.05–1. |

4. process according to claim 3,
wherein the alkali-free aluminosilicate glass batch (in % by weight based on oxide) comprises:

| | |
|---|---|
| $SiO_2$ | 59–62 |
| $Al_2O_3$ | 13.5–15.5 |
| $B_2O_3$ | 3–<5 |
| MgO | 2.5–5 |
| CaO | 8.2–10.5 |
| BaO | 8.5–9.5 |
| $ZrO_2$ | 0–1.5 |
| $TiO_2$ | 0–0.5 |
| $SnO_2$ | 0.05–1. |

5. A process according to claim 3,
wherein the alkali-free aluminosilicate glass batch (in % by weight based on oxide) comprises:

| | |
|---|---|
| $SiO_2$ | >58–62 |
| $Al_2O_3$ | 14–17.5 |
| $B_2O_3$ | 0–1 |
| MgO | 0–7 |
| CaO | 5.5–14 |
| SrO | 0–8 |
| BaO | 6–17 |
| $ZrO_2$ | 0–1.5 |
| $TiO_2$ | 0–0.5 |
| $SnO_2$ | 0.05–1. |

6. A process according to claim 5,
wherein the alkali-free aluminosilicate glass batch (in % by weight based on oxide) comprises:

| | |
|---|---|
| $SiO_2$ | >58–62 |
| $Al_2O_3$ | 15–17.5 |
| $B_2O_3$ | 0.2–0.7 |
| MgO | 0–<1 |
| CaO | 5.5–14 |
| SrO | 0–8 |
| BaO | 6–10 |
| $ZrO_2$ | 0.05–1 |
| $TiO_2$ | 0–0.5 |
| $SnO_2$ | 0.05–1. |

7. A process according to claim 2,
wherein the alkali-free aluminosilicate glass batch (in % by weight based on oxide) comprises:

| | |
|---|---|
| $SiO_2$ | 46–63 |
| $Al_2O_3$ | 12–25 |
| MgO | 0–5 |
| CaO | 3–14 |
| SrO | 0–11 |
| BaO | 6–15 |
| with MgO + CaO + SrO + BaO | ≦25 |
| with SrO + BaO | ≧10 |
| $ZrO_2$ | 0.1–5 |
| $P_2O_5$ | 0.1–9 |
| $SnO_2$ | 0.05–1. |

8. A process according to claim 1, wherein the alkali-free aluminosilicate batch comprises 0.1%–0.5% by weight of $SnO_2$.

9. A process according to claim 1, wherein no evaporation fining agents are added.

10. A process according to claim 1, wherein no decomposition fining agents are added.

11. A process according to claim 1, wherein the alkali-free aluminosilicate glass batch (in % by weight based on oxide) further comprises:

| | |
|---|---|
| $CeO_2$ | 0–0.6 |
| $MoO_3$ | 0–2 |
| $WO_3$ | 0–2 |
| $V_2O_5$ | 0–0.2 |
| $MnO_2$ | 0–0.2 |
| $Fe_2O_3$ | 0–0.5 |
| where $CeO_2 + MoO_3 + WO_3 + V_2O_5 + MnO_2 + Fe_2O_3$ | 0–3. |

12. A process according to claim 1, wherein the alkali-free aluminosilicate glass batch is free from $As_2O_3$, $Sb_2O_3$, CdO, PbO, $Bi_2O_3$, except for unavoidable impurities.

13. Alkali-free aluminosilicate glass having a composition as follows (in % by weight based on oxide)

| | |
|---|---|
| $SiO_2$ | 46–64 |
| $Al_2O_3$ | 12–26 |
| $B_2O_3$ | 0–<5 |
| MgO | 0–7 |
| CaO | 3–14 |
| SrO | 0–11 |
| BaO | 6–25 |
| $ZrO_2$ | 0–5 |
| $TiO_2$ | 0–0.6 |
| $P_2O_5$ | 0–9 |
| $SnO_2$ | 0.05–1. |

14. Alkali-free aluminosilicate glass according to claim 13,
having
a composition as follows (in % by weight based on oxide):

| | |
|---|---|
| $SiO_2$ | >55–64 |
| $Al_2O_3$ | 13–18 |
| $B_2O_3$ | 0–<5 |
| MgO | 0–7 |
| CaO | 5–14 |
| SrO | 0–8 |
| BaO | 6–17 |
| $ZrO_2$ | 0–2 |
| $TiO_2$ | 0–0.5 |
| $SnO_2$ | 0.05–1. |

15. Alkali-free aluminosilicate glass according to claim 14,
having
a composition as follows (in % by weight based on oxide):

| | |
|---|---|
| $SiO_2$ | 59–62 |
| $Al_2O_3$ | 13.5–15.5 |
| $B_2O_3$ | 3–<5 |
| MgO | 2.5–5 |
| CaO | 8.2–10.5 |
| BaO | 8.5–9.5 |
| $ZrO_2$ | 0–1.5 |
| $TiO_2$ | 0–0.5 |
| $SnO_2$ | 0.05–1. |

16. Alkali-free aluminosilicate glass according to claim 14,
having
a composition as follows (in % by weight based on oxide):

| | |
|---|---|
| $SiO_2$ | >58–62 |
| $Al_2O_3$ | 14–17.5 |
| $B_2O_3$ | 0–1 |
| MgO | 0–7 |
| CaO | 5.5–14 |
| SrO | 0–8 |
| BaO | 6–17 |
| $ZrO_2$ | 0–1.5 |
| $TiO_2$ | 0–0.5 |
| $SnO_2$ | 0.05–1. |

17. Alkali-free aluminosilicate glass according to claim 16,
having
a composition as follows (in % by weight based on oxide):

| | |
|---|---|
| $SiO_2$ | >58–62 |
| $Al_2O_3$ | 15–17.5 |
| $B_2O_3$ | 0.2–0.7 |
| MgO | 0–<1 |
| CaO | 5.5–14 |
| SrO | 0–8 |
| BaO | 6–10 |
| $ZrO_2$ | 0.05–1 |
| $TiO_2$ | 0–0.5 |
| $SnO_2$ | 0.05–1. |

18. Alkali-free aluminosilicate glass according to claim 13,
having
a composition as follows (in % by weight based on oxide):

| | |
|---|---|
| $SiO_2$ | 46–63 |
| $Al_2O_3$ | 12–25 |
| MgO | 0–5 |
| CaO | 3–14 |
| SrO | 0–11 |
| BaO | 6–15 |
| where $MgO + CaO + SrO + BaO$ | ≦25 |
| where $SrO + BaO$ | ≧10 |
| $ZrO_2$ | 0.1–5 |
| $P_2O_5$ | 0.1–9 |
| $SnO_2$ | 0.05–1. |

19. Alkali-free aluminosilicate glass according to claim 13, further comprising

| | |
|---|---|
| $CeO_2$ | 0–0.6 |
| $MoO_3$ | 0–2 |
| $WO_3$ | 0–2 |
| $V_2O_5$ | 0–0.2 |
| $MnO_2$ | 0–0.2 |
| $Fe_2O_3$ | 0–0.5 |
| where $CeO_2 + MoO_3 + WO_3 + V_2O_5 + MnO_2 + Fe_2O_3$ | 0–3. |

20. Alkali-free aluminosilicate glass according to claim 13, which, except for unavoidable impurities, is free from $As_2O_3$, $Sb_2O_3$, CdO, PbO, $Bi_2O_3$.

21. A process for producing an alkali-fre aluminosilicate glass, comprising melting a composition comprising (in % by weight based on oxide):

| | |
|---|---|
| $B_2O_3$ | <5; |
| BaO | >5.5; and |
| $SnO_2$ | 0.05–1.0 | and glass components constituting the aluminosilicate glass.

22. A process according to claim 21, further comprising batch charging the composition wherein the $SnO_2$ is added during batch charging.

23. A process according to claim 21, wherein the $SnO_2$ is added during melting.

24. A process according to claim 22, further comprising hot forming a glass made after melting.

25. A process according to claim 21, wherein the composition comprises 0.1%–0.5%, by weight based on oxide of $SnO_2$.

* * * * *